US006813274B1

(12) United States Patent
Suzuki et al.

(10) Patent No.: US 6,813,274 B1
(45) Date of Patent: Nov. 2, 2004

(54) NETWORK SWITCH AND METHOD FOR DATA SWITCHING USING A CROSSBAR SWITCH FABRIC WITH OUTPUT PORT GROUPS OPERATING CONCURRENTLY AND INDEPENDENTLY

(75) Inventors: Hiroshi Suzuki, Palo Alto, CA (US); Paul Chang, San Jose, CA (US); Sharat Prasad, San Jose, CA (US); Chien Fang, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/532,341

(22) Filed: Mar. 21, 2000

(51) Int. Cl.[7] .............................................. H04L 12/20
(52) U.S. Cl. ...................................... 370/412; 370/386
(58) Field of Search ................................ 370/412, 413, 370/414, 415, 416, 417, 418, 351, 235, 236, 229, 427, 428, 423, 360, 363, 368, 383, 230, 387, 388

(56) References Cited

U.S. PATENT DOCUMENTS

| | | |
|---|---|---|
| 5,274,631 A | 12/1993 | Bhardwaj |
| 5,367,520 A | 11/1994 | Cordell |

(List continued on next page.)

FOREIGN PATENT DOCUMENTS

WO    WO 98/44686    10/1998

OTHER PUBLICATIONS

Nick McKeown, "The iSLIP Scheduling Algorithm For Input–Qued Switches, IEEE/ACM Transactions On Networking", vol. 7, No. 2, Apr. 1999, pp. 188–201.

Arturo Cisneros, "Large Packet Switch Switch and Contention Resolution Device, International Switching Symposium Proceedings", Poster Session, Paer #14, vol. III, pp. 77–83.

Joan Garcia–Haro and Andrezej Jazszczyk, "ATM Shared–Memory Switching Architectures", IEEE NEtwork, May/Jun. 1994, vol. 8, No. 3, pp. 18–26.

Michael G. Hluchyj and Mark J. Karol, "Queueing In High Performance Packet Switching" IEEE Journal On Selected Areas In Communications, vol. 6, No. 9, Dec. 1988, pp. 1587–1597.

(List continued on next page.)

Primary Examiner—Douglas Olms
Assistant Examiner—Ricardo M. Pizarro
(74) Attorney, Agent, or Firm—Blakely, Sokoloff, Taylor & Zafman LLP

(57) ABSTRACT

A network switch and a method for data switching using a crossbar switch fabric with output port groups operating concurrently and independently that increases throughput and reduces scheduling complexity. The network switch includes a crossbar switch fabric, plurality of output port groups, and a plurality of input ports. The crossbar switch fabric includes a plurality of inputs and outputs. The plurality of output port groups operate concurrently and independently, and each output port group includes one or more output ports and is configured to receive a packet from one of the outputs of the crossbar switch and to send the packet to an output port. The plurality of input ports are coupled to an input of the crossbar switch fabric and configured to send packets to the crossbar switch fabric through the input of the crossbar switch fabric. Each input port includes a plurality of input buffer groups, and each input buffer group is assigned to send a packet for one of the output port groups such that there is a one-to-one correspondence between each of the input buffer groups and output port groups.

41 Claims, 8 Drawing Sheets

U.S. PATENT DOCUMENTS

| | | | |
|---|---|---|---|
| 5,500,858 A | * 3/1996 | McKeow | 370/412 |
| 5,577,035 A | 11/1996 | Hayter et al. | |
| 5,717,871 A | 2/1998 | Hsieh et al. | |
| 5,768,257 A | * 6/1998 | Khacherian et al. | 370/229 |
| 5,790,545 A | 8/1998 | Holt et al. | |
| 5,832,303 A | 11/1998 | Murase et al. | |
| 5,896,380 A | * 4/1999 | Brown et al. | 370/388 |
| 5,898,687 A | 4/1999 | Harriman et al. | |
| 6,044,061 A | 3/2000 | Aybay et al. | |
| 6,069,893 A | 5/2000 | Parruck et al. | |
| 6,072,772 A | * 6/2000 | Charny | 370/229 |
| 6,144,635 A | * 11/2000 | Nakagawa | 370/229 |
| 6,147,969 A | * 11/2000 | Benmohamed et al. | 370/230 |
| 6,160,812 A | * 12/2000 | Bauman | 370/416 |
| 6,185,188 B1 | 2/2001 | Hasegawa | |
| 6,185,221 B1 | * 2/2001 | Aybay | 370/412 |
| 6,188,686 B1 | * 2/2001 | Smith | 370/388 |
| 6,195,335 B1 | * 2/2001 | Calvignac | 370/236 |
| 6,212,182 B1 | * 4/2001 | McKeown | 370/390 |
| 6,343,066 B2 | 1/2002 | Magill et al. | |
| 6,349,097 B1 | * 2/2002 | Smith | 370/390 |
| 6,442,172 B1 | * 8/2002 | Wallner et al. | 370/416 |
| 6,515,991 B1 | * 2/2003 | McKeown | 370/390 |
| 6,519,225 B1 | * 2/2003 | Angle | 370/229 |
| 6,542,507 B1 | * 4/2003 | Khacherian et al. | 370/395.43 |
| 6,628,646 B1 | * 9/2003 | Angle et al. | 370/355 |

OTHER PUBLICATIONS

Soung C. Liew and Kevin W. Lu, "Comparison of Buffering Strategies For Asymmetric Packet Switcyh Modules", IEEE Journal On Selected Areas In Communication, vol. 8, No. 3, Apr. 1991, pp. 428–438.

Mark J. Karol and Chih–Lin I, "Performance Analysis of A Growable Architecture For Braod–Band Packet (ATM) Switching", IEEE Transactions On Communications, vol. 40, No. 2, Feb. 1992, pp. 431–439.

* cited by examiner

N=4
M=4

REQUESTS BY INPUT PORTS

GRANTING/DENYING OF REQUESTS

REQUESTS BY INPUT PORTS FOR OUTPUT GROUPS

GRANTING/DENYING OF REQUESTS

FIG. 8A

OUTPUT PORT GROUP SCHEDULING

| REQUESTS FROM INPUT PORTS #1 THROUGH #4 TO OUTPUT PORT GROUP | OUTPUT PORT GROUP 1 OPG1 |
|---|---|
| INPUT PORT 1 ← POINTER 2 | |
| INPUT PORT 2 | OUTPUT PORT 1 ← POINTER 1 |
| INPUT PORT 3 | OUTPUT PORT 2 |
| INPUT PORT 4 | |

FIG. 8B

OUTPUT PORT GROUP SCHEDULING

| REQUESTS FROM INPUT PORTS #1 THROUGH #4 TO OUTPUT PORT GROUP | OUTPUT PORT GROUP 1 OPG1 |
|---|---|
| INPUT PORT 1  H   ← POINTER 2 | |
| INPUT PORT 2  L | OUTPUT PORT 1 (P1) ← POINTER 1 |
| INPUT PORT 3  L | OUTPUT PORT 2 (P2) |
| INPUT PORT 4  H | |

NETWORK SWITCH AND METHOD FOR DATA SWITCHING USING A CROSSBAR SWITCH FABRIC WITH OUTPUT PORT GROUPS OPERATING CONCURRENTLY AND INDEPENDENTLY

FIELD OF THE INVENTION

The present invention pertains to the field of network switches and data switching. In particular, the present invention relates to a network switch and method for data switching using a crossbar switch fabric with output port groups operating concurrently and independently.

BACKGROUND OF THE INVENTION

A network switch is a data switching device that forwards a data unit ("packet") from a source network component to a destination network component. Typically, a network switch receives a packet from the source network component via an input port and sends a packet to the destination network component via an output port. A prior network switch for packet switching utilizes a crossbar switch. A crossbar switch is a switching device that forwards packets directly from input ports to output ports without buffering.

A problem associated with a crossbar switch is "output port contention." Output port contention occurs when multiple packets are destined to the same output port and only one packet may be forwarded to an output port at a time. As such, packets may be dropped with resulting data loss. To prevent data loss due to output port contention, packets are stored temporarily in input buffers on the input side of the crossbar switch allowing the packets to be forwarded at a later time. Another problem associated with a crossbar switch is "input port contention." Input port contention occurs when an input port has multiple requests to switch packets, and only one request can be granted at a time. Thus, packets may be dropped because of denied requests.

In a prior network switch, a single memory is logically partitioned to provide input buffers for inputs to the crossbar switch. The input buffers store temporarily packets that are to be forwarded to the crossbar switch to avoid data loss. For such a prior input buffer crossbar switch scheme, an input port may request to send a packet from an input buffer to multiple output ports. Also, the input port may request to send packets from multiple input buffers to a single output port. The prior input buffer crossbar switch scheme utilizes a single scheduler to resolve the requests to send packets from the input ports to the output ports. For a large switch, the number of requests a single scheduler is required to process is very high, which affects throughput and causes buffer memory to be used inefficiently. Throughput relates to the amount of packets that can be switched at one time. Throughput also relates to latency, that is, the amount of time it takes to switch the packets.

Furthermore, the single scheduler for the prior network switch must resolve output port contention for all the output ports such that each output port receives at most one packet at a time. The single scheduler must also resolve input port contention for all the input buffers of each input port such that each input port sends at most one packet at a time. As a result, a bottleneck may occur during packet switching because of the sophisticated input buffer management that is required for a single scheduler to resolve output port and input port contention.

For example, FIG. 1 shows a prior network switch 100 having an N×M crossbar switch 101, plurality of input ports (105, 110, 115, 120), plurality of output ports (135, 140, 145, 150), and a single scheduler 130. N×M crossbar switch 101 operates functionally as an N×M crossbar switch having N inputs and M outputs. For purposes of explanation, N and M=4 for N×M crossbar switch 101 such that N×M crossbar switch 101 has 4 inputs (inputs 1 through 4) and 4 outputs coupled to output ports 1 through 4 (135–150). Each output of crossbar switch 101 includes 4 data lines (data line 1 through 4). Data lines 1 through 4 are coupled with input ports 1 through 4, respectively.

Each output port 1 through 4 receives a set of data lines (data lines 1 through 4). Input ports 1 through 4 provide packets to crossbar switch 101 via inputs 1 through 4, respectively. Crossbar switch 101 forwards packets from the input ports to output ports 1 through 4 via corresponding data lines. Crossbar switch 101 provides a common interconnection for switching packets from input ports to output ports.

For the prior network switch 100, input ports 1 through 4 store packets temporarily in input buffer memories 106, 111, 116, and 121, respectively, that are partitioned into four input buffers 1 through 4. The input buffers are used to alleviate output port contention and allow N×M crossbar switch 101 to operate at an input line speed for the input buffer memories. Each input buffer is designated for one of the output ports. For example, input buffers 1 through 4 of input ports 1 through 4 are designated for output ports 1 through 4, respectively.

Input buffers 1 through 4 for input ports 1 through 4 provide packets to selectors 107, 112, 117, and 122, respectively. The selectors are devices that output selectively a single packet from multiple inputs. For example, selectors 107, 112, 117, and 122 select which packets from input buffers 1 through 4 are to be forwarded to crossbar switch 101. Scheduler 130 controls selectors 107, 112, 117, and 122 via request/control lines. Output ports 1 through 4 include selectors 136, 141, 146, and 151, respectively. The selectors for the output ports are devices that output selectively a single packet from multiple input data lines. Thus, selectors 136, 141, 146, and 151 select which packets are forwarded from input ports 1 through 4 to a respective output port. Scheduler 130 also controls selectors 136, 141, 146, and 151 via a control line coupled to each output port.

Scheduler 130 receives requests to send packets through crossbar switch 101 to desired output ports. Scheduler 130 receives the requests from input ports 1 through 4 via the request/control lines. Scheduler 130 schedules packet switching by granting or denying the requests. Scheduler 130 grants or denies the requests by sending control signals to selectors 107, 112, 117, and 122 via the request/control lines, which determine a desired packet from one of the input buffers 1 through 4 for forwarding to crossbar switch 101. Scheduler 130 also controls selectors 136, 141, 146, and 151 to receive a packet on one of the data lines 1 through 4 for output ports 1 through 4, respectively. For example, if scheduler 130 grants a request to send a packet from input buffer 1 of input port 1 to output port 1, scheduler 130 controls selector 107 to output a packet from input buffer 1 and controls selector 136 to receive the packet on data line 1 and output the packet to output port 1. A limitation with the prior network switch 100 is that scheduler 130 can grant only one request at a time for each input port. Thus, an input ports sends at most one packet at a time.

For example, FIG. 2a shows an illustration of input ports requesting to send packets to output ports for the prior network switch 100. Referring to FIG. 2a, input port 1 requests to send a packet to output ports 1 through 4. Input port 2 requests to send a packet to output port 3. Input port 3 has no requests to send a packet. Input port 4 requests to send a packet for output port 1 and output port 4.

For the prior switch 100, scheduler 130 must arbitrate requests for input ports 1 through 4 to send packets to output ports 1 through 4. A disadvantage with prior network switch 100 is that scheduler 130 must resolve N×M or 4×4 requests for output ports 1 through 4, which requires complex scheduling for a single scheduler. Another disadvantage related to the prior network switch 100 is that only one packet can be sent from an input port at a time. Consequently, because scheduler 130 can grant only one request for each input port at a time, throughput is reduced.

For example, FIG. 2b shows an illustration of scheduler 130 resolving requests for input ports 1 through 4. In particular, scheduler 130 must grant or deny the requests. Referring to FIG. 2b, scheduler 130 grants the request for input port 1 to transmit a packet to output port 1, but denies the request for input port 4 to send a packet to port 1. For output port 2, scheduler 130 denies the request for input port 1. For output port 3, scheduler 130 grants the request for input port 2, but denies the request for input port 1. For output port 4, scheduler 130 grants the request for input port 4, and denies the request for input port 1.

For the prior network switch 100, only one request can be granted at a time for each input port. As shown in FIG. 2b, input port 1, which has four requests, receives only one grant to send a packet and input port 4, which has two requests, also receives only one grant to send a packet. Thus, requests may be denied for each input port resulting in reduced throughput.

SUMMARY OF THE INVENTION

A network switch and a method for data switching are disclosed using a crossbar switch fabric with output port groups operating concurrently and independently. For one embodiment, the network switch includes a crossbar switch fabric, a plurality of output port groups, and a plurality of input ports. The crossbar switch fabric includes a plurality of inputs and outputs. The plurality of output port groups operate concurrently and independently. Each output port group includes one or more output ports and is configured to receive a packet from one of the outputs of the crossbar switch and to send the packet to an output port. Each input port is coupled to an input of the crossbar switch fabric and configured to send packets to the crossbar switch fabric via the input of the crossbar switch fabric. Each input port includes a plurality of input buffer groups, and each input buffer group is assigned to send a packet for one of the output port groups such that there is a one-to-one correspondence between each of the input buffer groups and output port groups.

For another embodiment, the network switch includes a plurality of schedulers receiving requests from the plurality of input ports for forwarding packets from the plurality of input ports to an output port group associated with each scheduler. Each scheduler schedules forwarding of the packets based on the received requests to the output port group associated with the scheduler. Each scheduler also schedules forwarding of the packets concurrently and independently.

Other features and advantages of the present invention will be apparent form the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which:

FIG. 2b is an illustration showing prior granting/denying of requests of FIG. 2a;

FIG. 7b is an illustration of granting/denying of requests of FIG. 7a;

FIG. 8a is an illustration of one embodiment showing an output port group scheduler scheduling packet switching; and FIG. 8b is an illustration of one embodiment showing an output port group scheduler scheduling packet switching using P priority levels.

DETAILED DESCRIPTION

Figure 1:
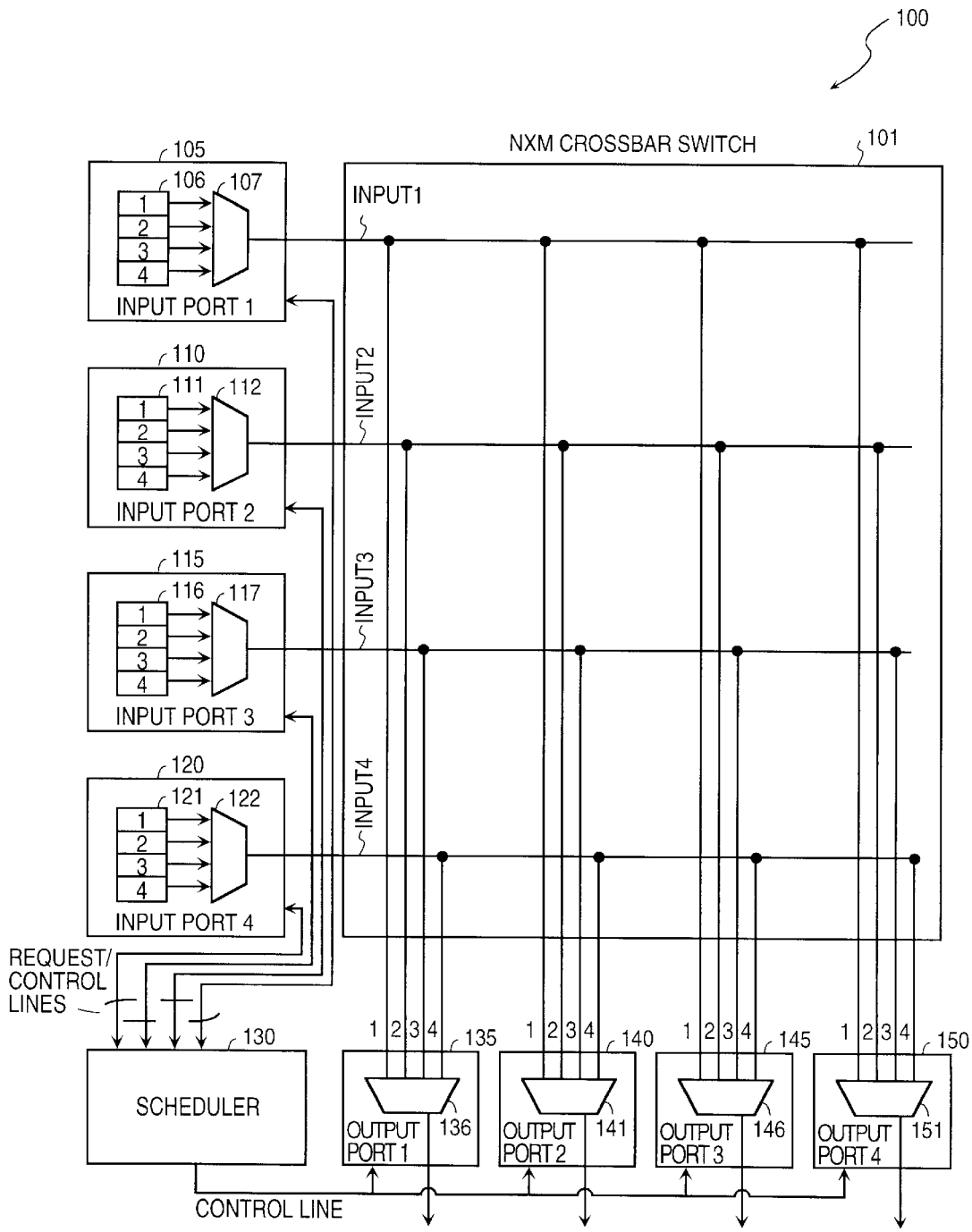
FIG. 1 is a block diagram illustrating a prior network switch.
Figure 2A:
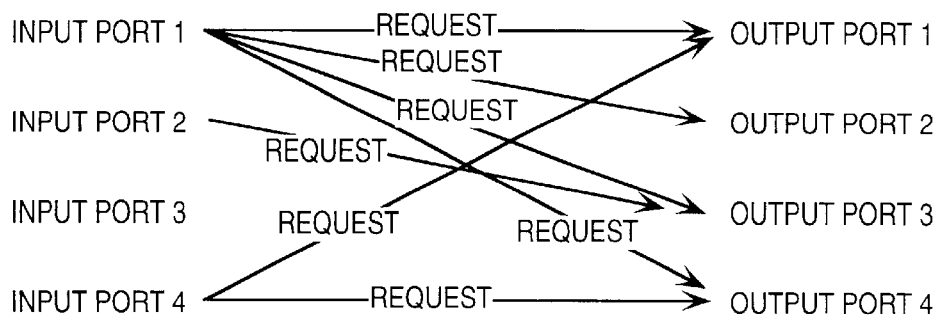
FIG. 2a is an illustration showing prior requests by input ports of FIG. 1.
Figure 2B:
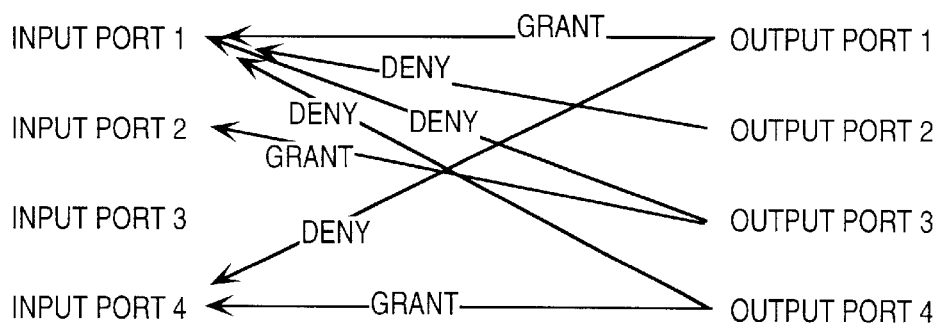

A network switch having a crossbar switch fabric with output port groups operating concurrently and independently is described. For one embodiment, the network switch includes a crossbar switch fabric, a plurality of output port groups, and a plurality of input ports. The crossbar switch fabric includes a plurality of inputs and outputs. The plurality of output port groups operate concurrently and independently. Each output port group includes one or more output ports and is configured to receive a packet from one of the outputs of the crossbar switch fabric and to send the packet to an output port. Each input port is coupled to an input of the crossbar switch fabric and configured to send packets to the crossbar switch fabric via the input of the crossbar switch fabric. Each input port includes a plurality of input buffer groups, and each input buffer group is assigned to send a packet for one of the output port groups such that there is a one-to-one correspondence between each of the input buffer groups and output port groups.

The network switch having a crossbar switch fabric with output port groups operating concurrently and independently increases throughput. The network switch improves throughput by having an input port with a plurality of input buffer groups such that each input buffer group is designated for one of the output port groups, which allows the input port to send multiple packets. For example, if an input port has two input buffer groups having one input buffer group designated for a first output port group and a second input buffer group designated for a second output port group, the input port may be granted requests to send two packets at one time: one packet from the first input buffer group to the first output port group, and a second packet from the second input buffer group to the second output port group.

For such a network switch, more than one input buffer group within an input port may send a packet at one time. Because an input port is capable of sending multiple packets at one time, the network switch improves throughput because more packets are forwarded during packet switching. The network switch also improves throughput by having a plurality of output port groups operating concurrently and independently. Throughput is improved because more requests may be processed as a result of each output port group operating concurrently and independently.

A method for data switching using a plurality of schedulers operating concurrently and independently is described. For one embodiment, the schedulers receive requests from the plurality of input ports for forwarding packets to an output port associated with each scheduler. The schedulers schedule concurrently and independently forwarding of packets based on the received requests to the output port group associated with the scheduler.

The method for data switching using a plurality of schedulers operating concurrently and independently reduces scheduling complexity. By using a plurality of schedulers (one for each output port group) instead of a single scheduler, the number of requests to be resolved by each scheduler is reduced. Thus, the scheduler for each output port group arbitrates and schedules a smaller number of requests and resolves contention among a smaller number of output ports, which reduces scheduling complexity. The method for data switching using a plurality of schedulers operating concurrently and independently also reduces scheduling delays. By having a plurality of schedulers operating concurrently and independently, more requests can be processed at one time for packet switching than by a single scheduler. Furthermore, less scheduling steps are required by using concurrent and independent operating schedulers.

In the following embodiments, scheduling for packet switching refers to receiving requests from input ports to forward packets to the output port groups. Scheduling also refers to a scheduler arbitrating the requests by granting or denying the requests for packet switching. Scheduling also refers to determining the order packets are to be switched based on granted requests. Scheduling also refers to controlling the input ports to output packets selectively and controlling the output port groups to receive selectively packets from the crossbar switch fabric based on the requests that are granted.

Also, in the following embodiments, the network switch is presented in the context of switching packets. Nevertheless, other types of data units may be used for switching such as, for example, data frames, blocks, or cells. The network switch may also be used in various types of network topologies such as, for example, Ethernet local area network (LAN), wide area network (WAN), asynchronous transfer mode (ATM) network, internet protocol (IP) network, or other types of networks requiring switching of fixed or variable sized data units. Packet switching refers to transmitting packets from a source network component to input ports, and forwarding the packets from the input ports to desired output ports. Packet switching also refers to transmitting the packets from the output ports to a destination network component.

Figure 3:
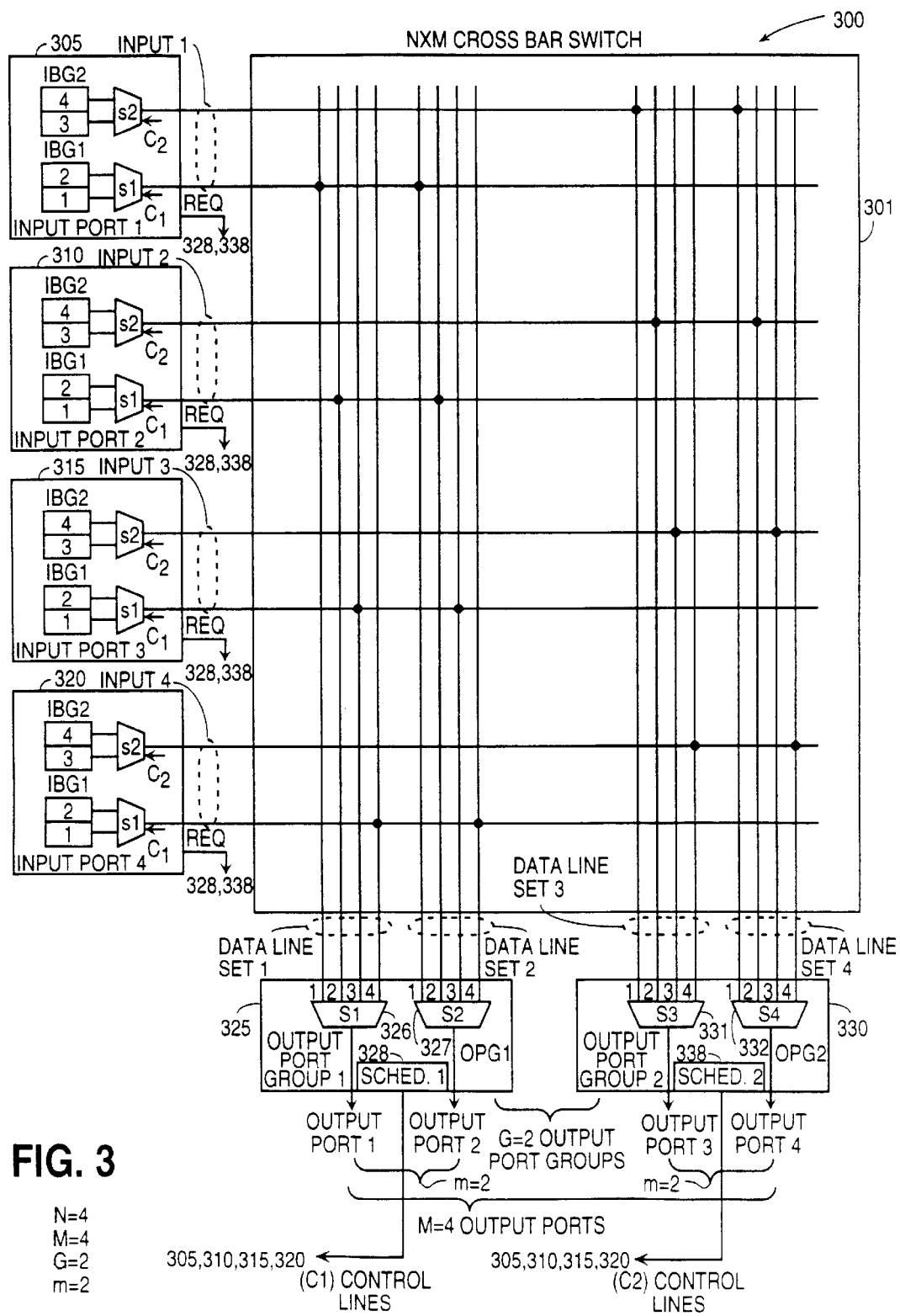
FIG. 3 is a block diagram illustrating a network switch having a crossbar switch fabric with output port groups operating concurrently and independently according to one embodiment.

FIG. 3 is a block diagram illustrating a network switch 300 having a crossbar switch fabric with output port groups operating concurrently and independently according to one embodiment.

Network switch 300 includes a crossbar switch fabric having inputs coupled to a plurality of input ports and outputs coupled to a plurality of output port groups. For network switch 300, each output of the crossbar switch fabric includes a set of data lines coupling an output port group to the input ports.

The input ports are connections to a source of packets such as, for example, a source network component. The input ports provide packets to the crossbar switch fabric for packet switching to the output port groups. The crossbar switch fabric is a switching device that acts as a common interconnection between the input ports and the output port groups. The crossbar switch fabric receives packets from the input ports and forwards the packets directly to the output port groups without packet buffering. The output port groups are a connection between the crossbar switch fabric and a destination network component. The output port groups receive packets from the crossbar switch fabric and send the packets to the destination network component through an output port.

To switch a packet from an input port to an output port group, the input port sends a request to a scheduler of a corresponding output port group destined to receive the packet. Based on the received requests, the scheduler is responsible for scheduling packet switching by granting or denying requests. The scheduler grants or denies the requests by sending a control signal to the input port informing the input port if the request is granted or denied. If the request is granted, the input port sends the packet to the crossbar switch fabric and the crossbar switch fabric forwards the packet to the desired output port group. The scheduler controls the output port group to receive the packet and send the packet to a desired output port. Each scheduler for each output port group operates concurrently and independently from schedulers of other output port groups.

Referring to FIG. 3, network switch 300 includes an N×M crossbar switch fabric 301, plurality of input ports (305, 310, 315, 320), and plurality of output port groups 325 (OPG1) and 330 (OPG2).

N×M crossbar switch fabric 301 operates functionally with N inputs and M outputs wherein N and M may be integers greater than 1. For purposes of explanation, N and M=4 and N×M crossbar switch fabric 301 is a 4×4 crossbar switch fabric for network switch 300. Network switch 300 operates functionally with M output ports divided into G equal-sized output port groups of m output ports wherein G=M/m and m may be an integer greater than 1. For purposes of explanation, m=2 and G=4/2=2 and network switch 300 includes M=4 output ports (output port 1 through 4), G=2 output port groups 325 (OPG1) and 330 (OPG2) having m=2 output ports. For example, OPG1 includes output ports 1 and 2 and OPG2 includes output ports 3 and 4.

N×M crossbar switch fabric 301 includes 4 inputs (inputs 1 through 4) and 4 outputs corresponding to sets of data lines (data line set 1 through data line set 4). Each data line set includes 4 data lines (data lines 1 through 4). Data lines 1 through 4 of each data line set is coupled to input ports 1 through 4, respectively. Input port ports 1 through 4 (305–320) are coupled to OPG1 via data line sets 1 and 2 and to OPG2 via data line sets 3 and 4. Data line sets 1 and 2 are also coupled to output ports 1 and 2 of OPG1, respectively. Data line sets 3 and 4 are also coupled to output ports 3 and 4 of OPG2, respectively.

OPG1 receives packets from N×M crossbar switch fabric 301 via data line sets 1 and 2. OPG2 receives packets from N×M crossbar switch fabric 301 via data line sets 3 and 4. OPG1 and OPG2 operate concurrently and independently and may receive packets from the same input port at the same time. For example, OPG1 is coupled to input ports 1 through 4 through data line set 1 and OPG2 is coupled to input ports 1 through 4 through data line set 3. Input port 1 may send a packet to OPG1 and a packet to OPG2 at the same time by using date line set 1 and data line set 3. As a result, network switch 300 increases throughput by allowing an input port to send more than one packet at a time.

Each of the G=2 output port groups OPG1 and OPG2 includes a scheduler and selectors. As shown in FIG. 3, OPG1 includes scheduler 1 (328) and selectors S1 (326) and S2 (327). Scheduler 1 is responsible for receiving requests (REQ) on request lines from input ports 1 through 4 to be switched to OPG1 via N×M crossbar switch fabric 301. Scheduler 1 grants or denies those requests by sending control signals (C1) on control lines coupled to input ports 1 through 4. Control signals (C1) inform the input ports whether a request is granted or denied. Selectors S1 and S2 of OPG1 are devices that receive selectively packets from data line sets 1 and 2, respectively, and output selected packets to output ports 1 and 2, respectively, for OPG1.

Scheduler 1 controls selectors S1 and S2 to receive selectively packets from data line sets 1 and 2 based on requests that have been granted. Scheduler 1 schedules switching of packets for OPG1 by determining which requests from the input ports are to be granted or denied. Scheduler 1 sends control signals (C1) to input ports 1 through 4 via control lines. Control signals (C1) determine which packets from which input ports are to be switched through N×M crossbar switch fabric 301 to selectors S1 and S2 for OPG1.

OPG2 includes scheduler 2 (338) and selectors S3 (331) and S4 (332). Scheduler 2 is responsible for receiving requests (REQ) on request lines from input ports 1 through 4 to be switched through N×M crossbar switch fabric 301 to OPG2. Scheduler 2 grants or denies those requests by sending control signals (C2) on control lines coupled to input ports 1 through 4. Control signals (C2) inform the input ports whether a request is granted or denied. Selectors s3 and s4 of OPG2 are devices that receive selectively packets from data line sets 3 and 4, respectively, and output selected packets to output ports 3 and 4, respectively, for OPG2.

Scheduler 2 controls selectors S3 and S4 to receive selectively packets from data line sets 3 and 4 based on requests that have been granted. Scheduler 2 schedules switching of packets for OPG2 by determining which requests from the input ports are to be granted or denied. Scheduler 2 sends control signals (C2) to input ports 1 through 4 via control lines. Control signals (C2) determine which packets from which input ports are to be switched through N×M crossbar switch fabric 301 selectors S3 and S4 for OPG2.

Input ports 1 through 4 include G=2 physically separate input buffer groups having a one to one correspondence to an output port group. For network switch 300, input ports 1 through 4 each include 2 physically separate input buffer groups IBG1 and IBG2 coupled to selectors s1 and s2, respectively. Each input port is coupled to data line sets 1 through 4 of N×M crossbar switch fabric 301. Selector s1 for each input port is coupled to data line sets 1 and 2. Selector s2 for each input port is coupled to data lines sets 3 and 4. IBG1 for each input port is coupled to OPG1 via selector s1 and data line sets 1 and 2. IBG2 for each input port is coupled to OPG2 via selector s2 and data line sets 3 and 4.

Each input buffer group IBG1 and IBG2 is designated for one of the 2 output port groups OPG1 and OPG2. For network switch 300, IBG1 is designated for OPG1 and IBG2 is designated for OPG2. For example, IBG1 is assigned to send packets to OPG1 and IBG2 is assigned to send packets to OPG2. Each input buffer group also includes G=2 input buffers and each input buffer is assigned to one of the output ports for one of the output port groups. For example, IBG1 includes input buffers 1 and 2. Input buffer 1 for IBG1 is designated to output port 1 of OPG1. Input buffer 2 for IBG1 is designated to output port 2 of OPG1. IBG2 includes input buffers 3 and 4. Input buffer 3 for IBG2 is designated to output port 2 of OPG2. Input buffer 4 for IBG2 is designated to output port 4 of OPG2.

Each input buffer group may be a separate memory such as, for example, static random access memory (SRAM), dynamic random access memory (DRAM), flash memory, or other suitable memory. Each input buffer may also be a logical queue or a virtual output queue (VOQ). Each logical queue or VOQ is coupled to a separate line card (not shown) that provides packets to a logical queue or VOQ. The logical queue or VOQ operates such that if the logical queue or VOQ exceeds a predetermined threshold, a backpressure signal (BPS) is generated by the logical queue or VOQ to the linecard. The linecard maintains separate packet queues for each logical queue or VOQ. The linecard will also send a packet from a packet queue to the logical queue or VOQ only if no backpressure signal has been received from the corresponding logical queue or VOQ. By using the backpressure signal, the amount of buffers needed to achieve high throughput can be reduced.

For each input port, selector s1 has two inputs coupled to input buffers 1 and 2. Selector s2 has two inputs coupled to input buffers 3 and 4. Scheduler 1 controls selector s1 for IBG1 using control signal (C1) to schedule switching of packets from IBG1 to OPG1. Scheduler 2 controls selector s2 for IBG2 using control signal (C2) and to schedule switching of packets from IBG2 to OPG2. Schedulers 1 and 2 control selectors s1 and s2, respectively, by sending control signals (C1) and (C2) to selectors s1 and s2 via control lines. For example, if a request to send a packet from input buffer 1 of input port 1 is granted, scheduler 1 sends a control signal (C1) on a control line coupled to selector s1 for IBG1 to receive a packet from input buffer 1 and to output the packet to N×M crossbar switch fabric 301. Scheduler 1 may then control selectors S1 (326) or S2 (326) of OPG1 to receive the packet for output port 1 or output port 2.

Thus, network switch 300 using multiple schedulers reduces scheduling complexity. For example, a 4×4 switching fabric is configured to 2 sets of 4×2 switching fabrics. Thus, schedulers 1 and 2 of network switch 300 are required to resolve 4×2 requests instead of 4×4 requests that would occur if a single scheduler were used. Furthermore, because schedulers 1 and 2 operate concurrently and independently, resolving 2 sets of 4×2 requests can be performed simultaneously, thereby reducing the amount of time for scheduling and switching packets through the N×M crossbar switch fabric.

Figure 4:
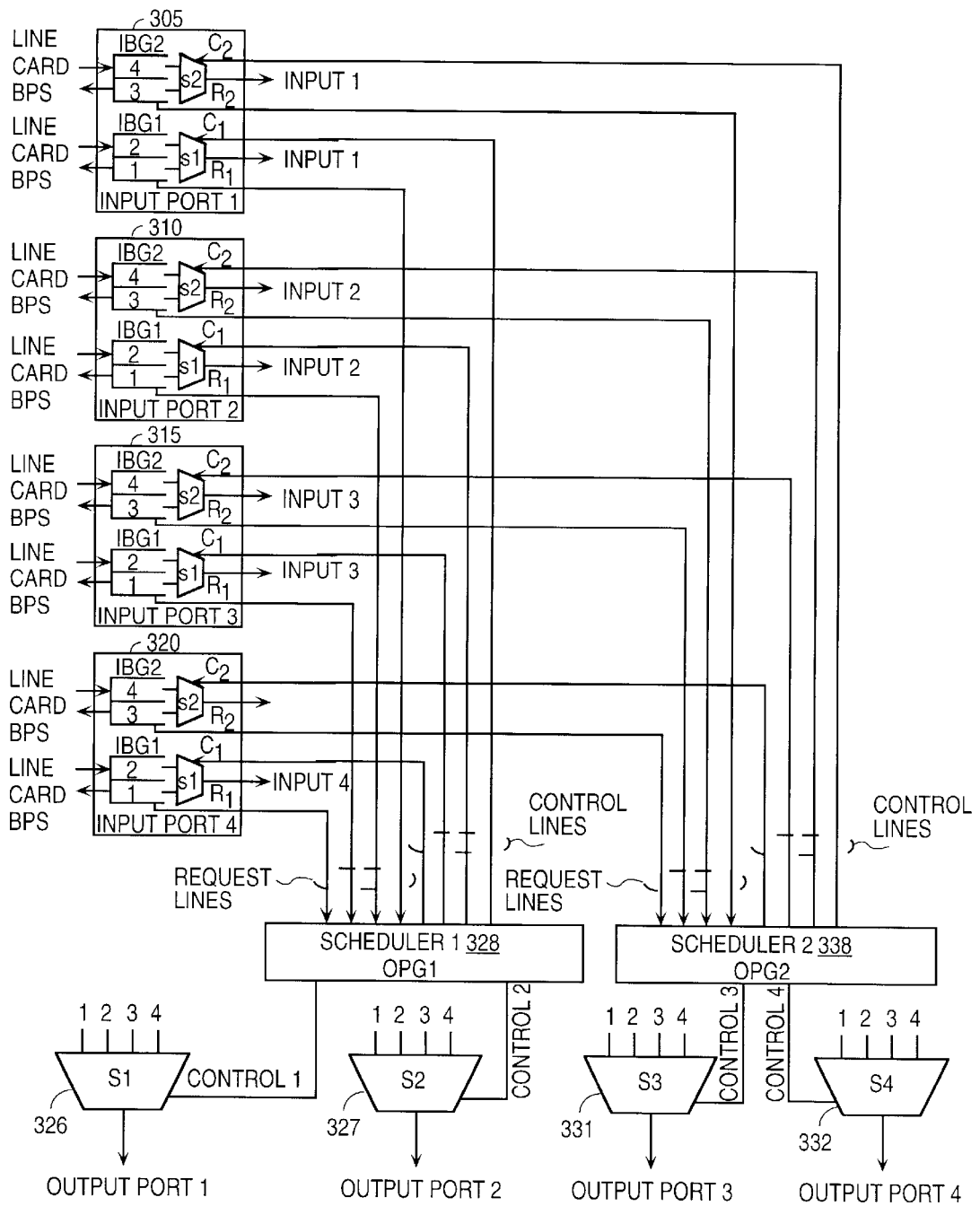
FIG. 4 is a block diagram illustrating the interconnections between schedulers and input ports of FIG. 3.

FIG. 4 is a block diagram illustrating the interconnections between schedulers 1 and 2 and input ports 1 through 4 of FIG. 3. Referring to FIG. 4, network switch 300 includes scheduler 1 (328) of OPG1 and scheduler 2 (338) of OPG2 coupled to input ports 1 (305) through 4 (320). Scheduler 1 is coupled to input ports 1 through 4 via request lines R1 and control lines C1. Scheduler 2 is coupled to input ports 1 through 4 via request lines R2 and control lines C2. Request lines R1 couple scheduler 1 to IBG1 of each input port. Request lines R2 couple scheduler 2 to IBG2 of each input port. Scheduler 1 is coupled to selector s1 for each input port via control lines C1. Scheduler 2 is coupled to selector s2 for each input port via control line C2. Scheduler 1 is also coupled to selectors SI (326) and S2 (327) of OPG1 via control lines 1 and 2, respectively. Scheduler 2 is also coupled to selectors S3 (331) and S4 (332) of OPG2 via control lines 3 and 4, respectively. Scheduling of requests will now be discussed with respect to schedulers 1 and 2 of FIG. 4.

Scheduler 1 schedules packet switching from IBG1 of each input port to OPG1 and scheduler 2 schedules packet switching from IBG2 of each input port to OPG2. Scheduler 1 also selects which output ports 1 or 2 are to receive a packet by controlling selectors S1 or S2, accordingly, to receive the packet. Scheduler 2 also selects which output ports 3 or 4 are to receive a packet by controlling selectors S3 and S4, accordingly, to receive the packet. Scheduler 1 and 2 may schedule switching of packets concurrently and independently.

For example, input port 4 may send a request on request line R1 to scheduler 1 for sending a packet from input buffer 1 of IBG1 to output port 1 of OPG1. Scheduler 1 may grant the request by sending an appropriate control signal on control line C1 to selector s1 for selector s1 to output the packet from input buffer 1 on input 4 of the crossbar switch fabric. To receive the packet for OPG1, scheduler 1 controls selector S1 to receive the packet on data line 1 and to output the packet to output port 1.

At the same time, input port 4 may send a request on request line R2 scheduler 2 for sending a packet from input buffer 3 of IBG2 to output port 3 of OPG2. Scheduler 2 may grant the request by sending an appropriate control signal on control line C2 to selector s2 for selector s2 to output the packet from input buffer 3 on input 4 of the crossbar switch fabric. To receive the packet for OPG2, scheduler 2 controls selector S3 to receive the packet on data line 3 and to output the packet to output port 3.

Thus, input port 4 may send multiple packets at one time and may have multiple requests granted for packet switching. Furthermore, scheduler 1 and scheduler 2 may operate concurrently and independently, which increases throughput by allowing more packets to be forwarded per input port.

Figure 5:
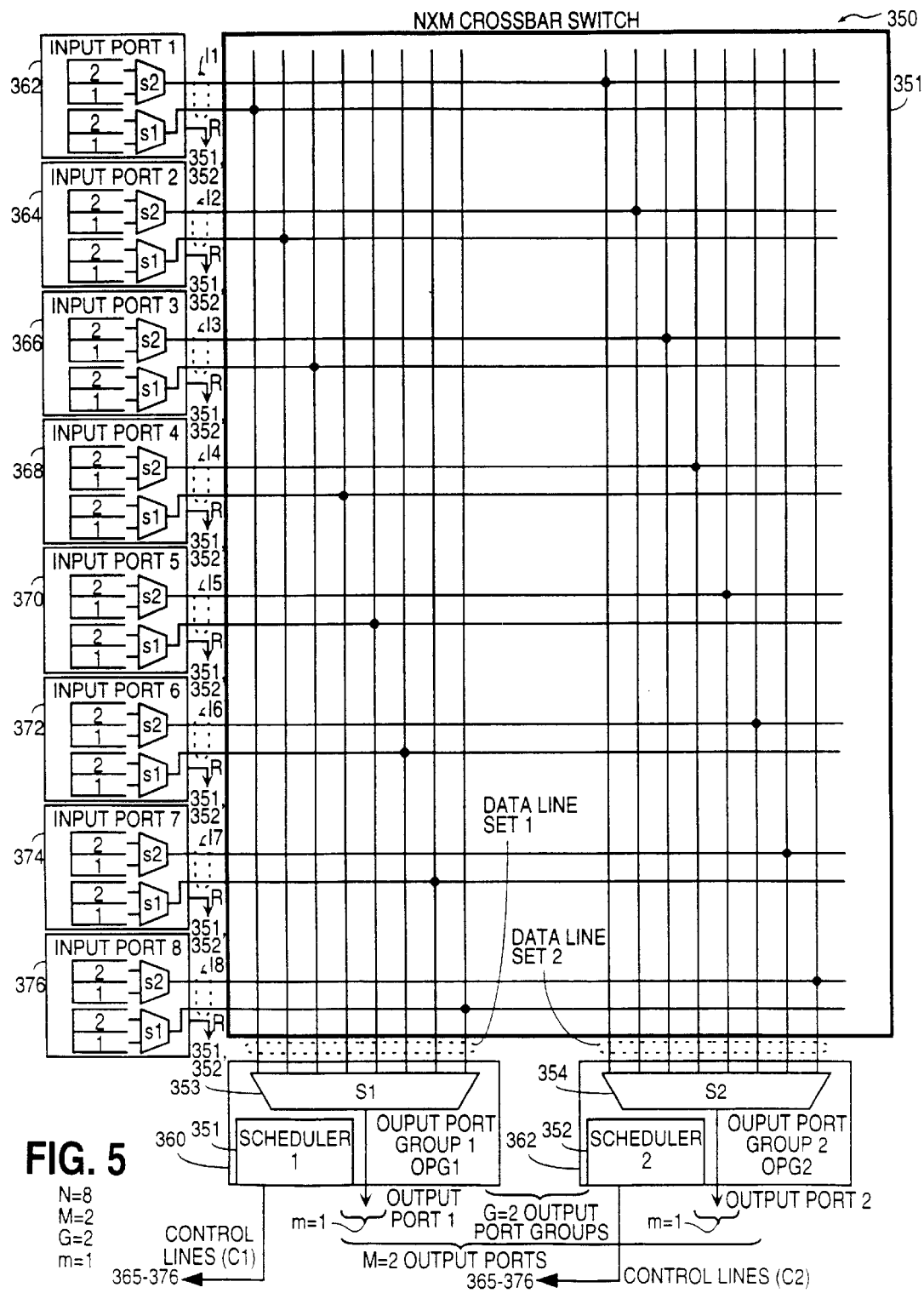
FIG. 5 is a block diagram illustrating a network switch having a crossbar switch fabric with output port groups operating concurrently and independently according to another embodiment.

FIG. 5 is a block diagram illustrating a network switch 350 having a crossbar switch fabric with output port groups operating concurrently and independently according to another embodiment.

Referring to FIG. 5, network switch 350 includes an N×M crossbar switch fabric 351, which is coupled to a plurality of input ports 1 (362) through 8 (376) and a plurality of output port groups 360 (OPG1) and 362 (OPG2). N×M crossbar switch fabric 351 operates functionally with N inputs and M outputs wherein N and M are integers greater than 1. For purposes explanation, N=8 and M=2 and N×M crossbar switch fabric 351 is a 8×2 crossbar switch fabric for network switch 350. Network switch 350 operates functionally with M output ports divided into G equal-sized output port groups of m output ports wherein G=M/m and m may be an integer greater than 1. For network switch 350 m=1 and G=2/1=2 and network switch 350 includes M=2 output ports (output port 1 and output port 2) and G=2 output port groups 360 (OPG1) and 362 (OPG2) having m=1 output ports. OPG1 includes output port 1 and OPG2 includes output port 2.

For purposes of explanation, input ports 1 through 8 are constructed and operate in a similar manner as input ports 1 through 4 of FIG. 3. Input ports 1 through 8 are coupled to N×M crossbar switch fabric 351 via inputs 1 through 8 labeled as (I1–I8). OPG1 and OPG2 are coupled to N×M crossbar switch fabric 351 via data line sets 1 and 2, respectively.

For purposes of explanation, OPG1 and OPG2 are constructed and operate in a similar manner as OPG1 and OPG2 of FIG. 3, except that scheduler 1 (351) and scheduler 2 (352) are responsible for resolving only input port contention for input ports 1 through 8, and not for output port contention. That is, for network switch 350, there is no output port contention because there is only one output port for each output port group, which reduces significantly scheduling complexity. For example, scheduler 1 for OPG1 resolves contention for output port 1 (only) that requires only one packet to be selected from one of the input ports. Likewise, scheduler 2 for OPG2 resolves contention for output port 2 (only) that requires only one packet to be selected from one of the input ports.

Figure 6:
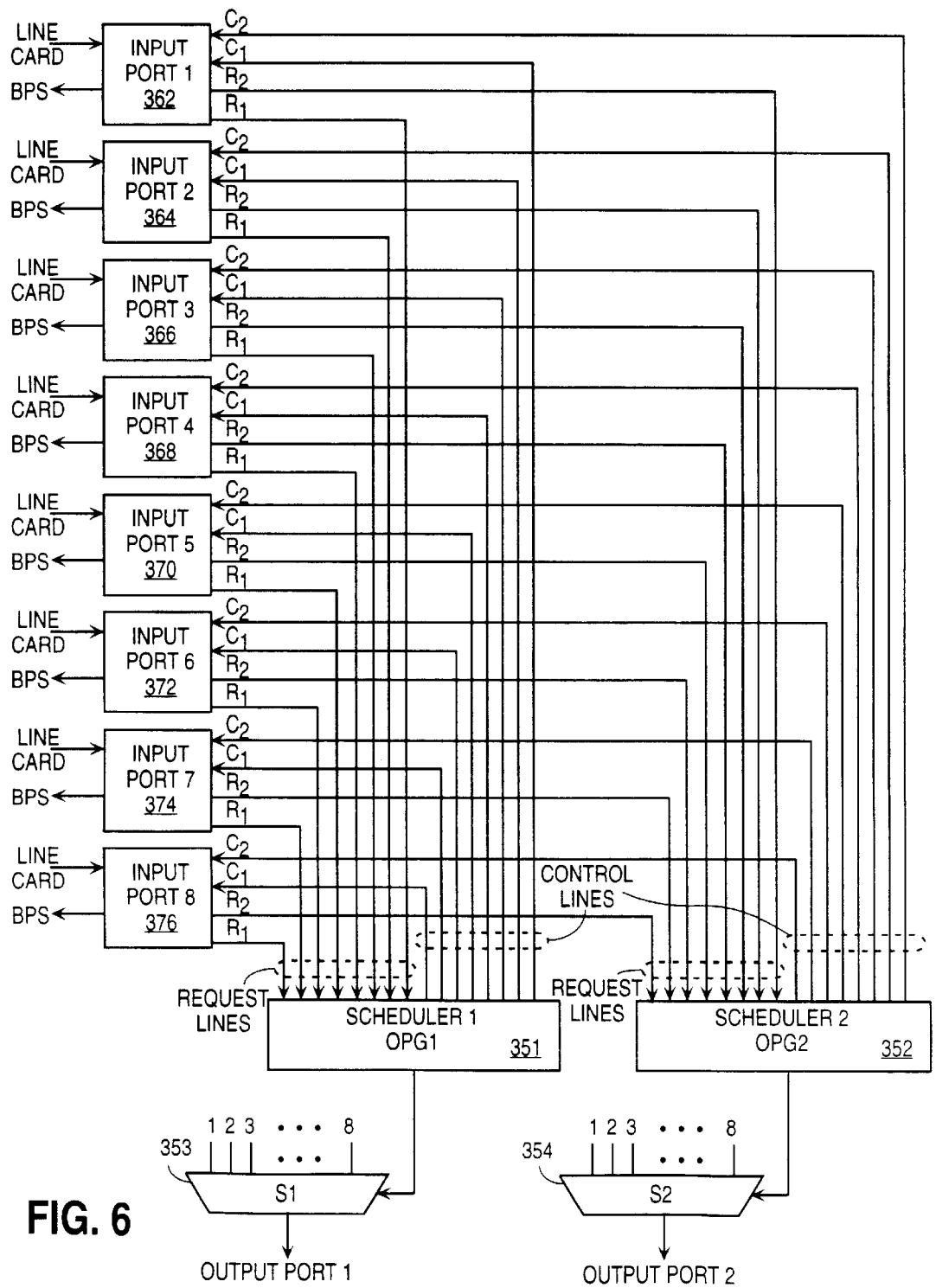
FIG. 6 is a block diagram illustrating the interconnections between schedulers and input ports of FIG. 5.

FIG. 6 is a block diagram illustrating the interconnections between schedulers and input ports of FIG. 5. Referring to FIG. 6, network switch 350 includes scheduler 1 (351) for OPG1 and scheduler 2 (352) for OPG 2 coupled to input ports 1 through 8. Scheduler 1 is coupled to input ports 1 through 8 via request lines R1 and control lines C1. Scheduler 2 is coupled to input ports 1 through 8 via request lines R2 and control lines C2.

For purposes of clarity, the internal components of input ports 1 through 8 have been omitted, which are constructed in the same manner as input ports 1 through 4 of FIG. 4, but coupled to 8 data lines instead of 4. Also, for purposes of explanation, scheduler 1 (351) of OPG1 and scheduler 2 of OPG2 operate in the same manner as scheduler 1 and scheduler 2 of FIG. 4 except for scheduling packet switching for one output port instead of two.

For example, input port 8 may send a request to scheduler 1 and scheduler 2 to forward a packet to output port 1 and output port 2. Scheduler 1 and scheduler 2 may grant the requests and allow input port 8 to send multiple packets. Scheduler 1 will control selector S1 (353) to select a packet on data line 8 of data line set 1 and to forward the packet to output port 1. Likewise, scheduler 2 may control selector S2 (354) to select a packet on data line 8 of data line set 2 and to forward the packet to output port 2.

Thus, input port 8 may send multiple packets at one time and may have multiple requests granted for packet switching. Furthermore, scheduler 1 and scheduler 2 may operate concurrently and independently, which increases throughput by allowing more packets to be forwarded per input port.

Figure 7A:
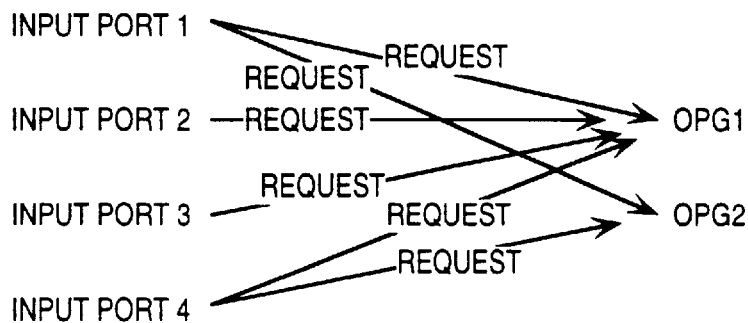
FIG. 7a is an illustration of requests by input ports for output port groups according to one embodiment.

FIG. 7a is an illustration of requests by input ports for output port groups according to one embodiment. For purposes of explanation, FIG. 7a refers to network switch 300 of FIGS. 3 and 4 having input ports 1 through 4 and two output port groups OPG1 and OPG2.

Referring to FIG. 7a, input port 1 requests to send a packet to OPG1 and OPG2 on respective request lines R1 and R2, respectively. Input port 2 requests to send a packet to OPG 1 on a respective request line R1. Input port 3 has no requests to send a packet. Input port 4 requests to send a packet to OPG1 and OPG2 on respective request lines R1 and R2. Scheduler 1 receives requests for OPG1 and arbitrates and schedules switching of packets for OPG1 for output ports 1 and 2. Scheduler 2 receives requests for OPG2 and arbitrates and schedules switching of packets for OPG2 for output ports 3 and 4.

Thus, schedulers 1 and 2 arbitrate requests and schedule switching of packets for a 4×2 switching fabric instead of a 4×4 switching fabric. Also, network switch 300 allows for multiple requests to be granted for an input port as illustrated in FIG. 7b.

Figure 7B:
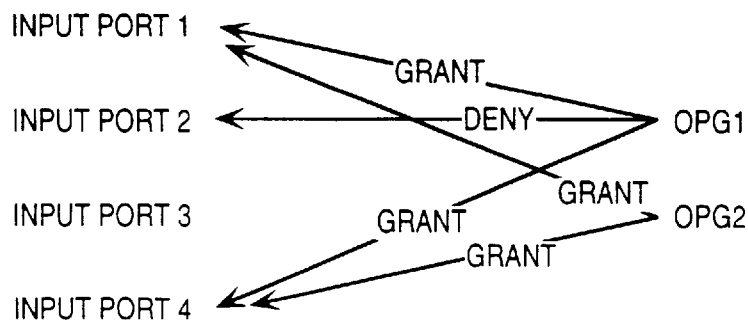

For example, FIG. 7b is an illustration of granting/denying of requests of FIG. 7a. As shown in FIG. 7b, OPG1 grants a request to send a packet for input ports 1 and 4 and denies a request to send a packet for input port 2. OPG 2 grants a request to send a packet for input ports 1 and input ports 4. Input port 1 is granted two requests to send packets to OPG1 and OPG2. Input 4 is also granted two requests to send packets to OPG1 and OPG2. Thus, multiple packets may sent from an input port, which increases throughput.

For example, input port 1 may request to send a packet from input buffer 1 to OPG 1 through output group 1 and request to send a packet from input buffer 3 to OPG 2 through output group 3. Likewise, input port 4 may request to send a packet from input buffer 1 to OPG 1 through output group 1 and request to send a packet from input buffer 3 to OPG 2 through output group 3. Schedulers 1 and 2 may grant both requests for input port 1 and input port 4 because input buffers 1 are designated for OPG1 and input buffers 3 are designated for OPG2.

FIG. 8a is an illustration of one embodiment showing how an output port group schedules packet switching. Each scheduler for an output port group maintains a first pointer and a second pointer for the scheduling process. For purposes of explanation, the following discussion refers to OPG1 of network switch 300 of FIG. 3, and applies for any output port group.

Initially, the first pointer points to one of the output ports 1 or 2 for OPG1. In the example of FIG. 8a, the first pointer points to output port 1. The second pointer points to one of the N=4 input ports 1 through 4 requesting to send a packet. In the example of FIG. 8a, the second pointer points to input port 1. The illustration assumes that all input ports are requesting to send packets to OPG1 for output ports 1 and 2. Scheduler 1 for OPG1 performs the scheduling process based on the requests from input ports 1 through 4 for output ports 1 and 2. The scheduling process will now be described with respect to scheduler 1.

Scheduler 1 selects a request designated for output port 1 based on the first pointer. Scheduler 1 then grants a request for input port 1 to send a packet to output port 1 based on the second pointer. If the request is granted, the other requests on input ports 2, 3, and 4 will be masked and no packets will be sent for those requests. For one embodiment, after the request is granted for output port 1, the first and second pointers are updated in a round robin manner. For example, the first pointer is updated to point to the next output port (output port 2) and the second pointer is updated to point to the next input port (input port 2).

In the same manner as output port 1, scheduler 1 will schedule requests for output port 2 using the first pointer and second pointer. For one embodiment, if there are more output ports, such output ports are serviced one by one according to the first pointer position being updated in a round robin manner. The input ports are also serviced one by one according to the second pointer being updated in a round robin manner.

Although the schedulers run in parallel, output ports are serviced in a sequential manner. The scheduling algorithm ensures that each input buffer group for each input port sends at most one packet and each output port receives at most one packet at a time.

FIG. 8b is an illustration of one embodiment showing how an output port group schedules packet switching using P priority levels. For example, the scheduling process illustrated in FIG. 8a can be extended to support P priority levels wherein P is an integer greater than one. For purposes of explanation, the following discussion refers to OPG1 for network switch 300 of FIG. 3, and applies for all output port groups.

Initially, the first pointer points to an output port with at least one request designated for the output port having a highest priority level within P priority levels. In the example of FIG. 8b, P=2 and the priority levels are high "H" and low "L." If there are no request with the highest priority level, the first pointer will be initialized to the next output port having the next highest priority level. For one embodiment, the next output port having the next highest priority level may be selected according to a round robin manner. In such a scheduling scheme, the second pointer will point to input port with a request having at least one of the highest priority requests.

The illustration assumes that all input ports are requesting to send packets to OPG1 for output ports 1 and 2. In the example of FIG. 8b, the first pointer points to output port 1 having a request designated with the highest priority level "H," and the second pointer points to input port 1. Scheduler 1 for OPG1 performs the scheduling process based on the requests from input ports 1 through 4 for output ports 1 and 2. The scheduling process will now be described with respect to scheduler 1.

Scheduler 1 selects output port 1 to receive a request having the highest priority level (H) based on the first pointer. Scheduler 1 then grants the request with the highest priority level for input port 1 based on the second pointer. For one embodiment, the first and second pointer are updated according to a round robin manner. Alternatively, the first and second pointers may be updated based on priority levels of the requests. Scheduler 1 may then perform a scheduling process using the updated first and second pointers.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

What is claimed is:

1. A network switch, comprising:
    a crossbar switch fabric having a plurality of inputs and outputs;
    a plurality of output port groups operating concurrently and independently, each output port group including one or more output ports and being configured to receive a packet from one of the outputs of the crossbar switch and to send the packet to an output port; and
    a plurality of input ports, each input port being coupled to an input of the crossbar switch fabric and configured to send packets to the crossbar switch fabric through the input of the crossbar switch fabric, wherein each input port includes:
        a plurality of input buffer groups, each input buffer group is
        assigned to send a packet for one of the output port groups such
        that there is a one-to-one correspondence between each of the
        input buffer groups and output port groups.

2. The network switch of claim 1, wherein the crossbar-switch fabric is a N×M crossbar switch fabric having N inputs and M outputs, and wherein N and M are an integer greater than one.

3. The network switch of claim 2, wherein each output port group is coupled to m output ports, and wherein m is an integer and M is divisible by m.

4. The network switch of claim 3, wherein the plurality of output port groups include G output port groups, and wherein G is an integer and=M/m.

5. The network switch of claim 3, wherein the plurality of input ports include N input ports.

6. The network switch of claim 5, wherein each of the N input ports includes:
G separate input buffer groups, each of the G separate input buffer groups is assigned to send packets for one of the G output port groups such that there is a one-to-one correspondence between each of the G separate input buffer groups and G output port groups.

7. The network switch of claim 6, wherein each of the G input buffer groups includes m logical queues, and each of the m logical queues is dedicated to send packets to one of the m output ports for the corresponding output port group.

8. The network switch of claim 7, wherein the m logical queues are virtual output queues configured to receive and store packets from a line card.

9. The network switch of claim 8, wherein each virtual output queue is configured such that packets are not received from a line card by the virtual output queue if packets stored in the virtual output queue exceed a predetermined threshold.

10. The network switch of claim 7, further comprising:
G schedulers operating independently and concurrently, each of the G schedulers being designated for one of the G output port groups and configured to schedule switching of packets for an N×m switching fabric.

11. The network switch of claim 10, wherein each of the G schedulers is also configured to arbitrate requests from the N input ports for a N×m switching fabric.

12. The network switch of claim 11, wherein each of the G schedulers arbitrate requests from the N input ports using a first pointer that points to one of the m output ports coupled to the corresponding output port group for the scheduler and a second pointer that points to one of the N input ports.

13. The network switch of claim 12, wherein each of the G schedulers is also configured to allow selectively the corresponding output port group to receive a packet on a selected one of the m output ports according to the first pointer and receive the packet form a selected one of the N input ports according to the second pointer.

14. The network switch of claim 13, wherein the first pointer points to one of the m output ports in a round robin manner, and wherein the second pointer points to one of the N input ports in a round robin manner.

15. The network switch of claim 12, wherein each of the G schedulers is configured to arbitrate requests from the N input ports using multiple priority levels for the requests.

16. The network switch of claim 14, wherein the multiple priority levels include P priority levels, and wherein P is an integer greater than one.

17. The network switch of claim 15, wherein the each of the G schedulers is configured to perform P iterations, and wherein the first pointer points to one of the m output ports having a request with the highest priority.

18. A networking hardware apparatus, comprising:
a) a switch fabric having a plurality of inputs and a plurality of outputs, a first set of said outputs groups into a first group of outputs, a second set of said outputs grouped into a second group of outputs, said first group not including any of said second group's switch fabric outputs;
b) a first scheduler to influence as second flow of switch traffic that emanates from said first group of outputs and flows from one or more output points;
c) a second scheduler to influence as second flow of switch traffic that emanates from said second group of outputs and flows from one or more other output ports; and,
d) a plurality of input ports, each input port comprising a first queue and a second queue, said first queue to buffer traffic destined to emanate as switched traffic from said first group of outputs, said second queue to buffer traffic destined to emanate as switched traffic from said second group of outputs.

19. The networking hardware apparatus of claim 18 wherein each of said input ports further comprise:
1) a first output coupled to said first queue to provide to said switch fabric at one of said inputs said traffic destined to emanate as switched traffic from said first group of outputs;
2) a second output coupled to said second queue to provide to said switch fabric at another of said inputs said traffic destined to emanate as switched traffic from said first group of outputs;
where, each input port output from amongst said plurality of input ports is coupled to a different one of said switch fabric inputs.

20. The networking hardware apparatus of claim 19 wherein said switch fabric comprises a crossbar switch fabric.

21. The networking hardware apparatus of claim 20 wherein said crossbar switch fabric comprises an N×M crossbar switch fabric where N is the number of said inputs and M is the number of said crossbar switch fabric outputs, and where N is an integer greater than 1 and M is an integer greater than 1.

22. The networking hardware apparatus of claim 21 wherein N and M are equal.

23. The networking hardware apparatus of claim 21 wherein N is greater than M.

24. The networking hardware apparatus of claim 20 further comprising:
1) a first pointer maintained by said first scheduler to alternatively point to an output port from said one or more output ports and a second pointer maintained by said first scheduler to alternatively point to an input port from said plurality of input ports;
2) a first pointer maintained by said second scheduler to alternatively point to an output port from said one or more other output ports and a second pointer maintained by said second scheduler to alternatively point to an input port from said plurality of input ports.

25. The networking hardware apparatus of claim 24 further comprising request lines for each of said first queues coupled to said first scheduler to submit requests for servicing of said first queues by said switch fabric and request lines for each of said second queues coupled to said second scheduler to submit requests for servicing of said second queues by said switch fabric.

26. The networking hardware apparatus of claim 25 further comprising control lines coupled between each of said first queues and said first scheduler to transport responses to said requests for servicing of said first queues, and, control lines coupled between each of said second queues and said second scheduler to transport responses to said requests for servicing of said second queues.

27. The networking hardware apparatus of claim 18 wherein said switch fabric comprises a crossbar switch fabric.

28. The networking hardware apparatus of claim 18 further comprising:
1) a first pointer maintained by said first scheduler to alternatively point to an output port from said one or more output ports and a second pointer maintained by said first scheduler to alternatively point to an input port from said plurality of input ports;
2) a first pointer maintained by said second scheduler to alternatively point to an output port from said one or more other output ports and a second pointer maintained by said second scheduler to alternatively point to an input port from said plurality of input ports.

29. The networking hardware apparatus of claim 28 further comprising request lines for each of said first queues coupled to said first scheduler to submit requests for servicing of said first queues by said switch fabric and request lines for each of said second queues coupled to said second scheduler to submit requests for servicing of said second queues by said switch fabric.

30. The networking hardware apparatus of claim 29 further comprising control lines coupled between each of said first queues and said first scheduler to transport responses to said requests for servicing of said first queues, and, control lines coupled between each of said second queues and said second scheduler to transport responses to said requests for servicing of said second queues.

31. A method, comprising:
scheduling an output flow for one or more output ports whose traffic is supplied by a first group of outputs from a switch fabric;
scheduling an output flow for one or more other output ports whose traffic is supplied by a second group of outputs from said switch fabric; said first group not including any of said second group's switch fabric outputs, said second group not including any of said first group's switch fabric outputs;
queuing, in a first queue of a first input port, traffic destined to be switched by said switch fabric and emanated from said switch fabric from said first group of switch fabric outputs; and,
queuing, in a second queue of said first input port, traffic destined to be switched by said switch fabric and emanated from said switch fabric from said second group of switch fabric outputs.

32. The method of claim 31 further comprising:
sending, along a first input to said switch fabric, said traffic destined to be switched by said switch fabric and emanated from said switch fabric from said first group of switch fabric outputs;
sending, along a second input to said switch fabric, said traffic destined to be switched by said switch fabric and emanated from said switch fabric from said second group of switch fabric outputs.

33. The method of claim 32, wherein said switch fabric comprises a crossbar switch.

34. The method of claim 32, further comprising:
submitting, to a first scheduler that performed said scheduling of said output flow for one or more output ports whose traffic is supplied by said first group of outputs from said switch fabric, requests for said sending of traffic destined to be switched by said switch fabric and emanated from said switch fabric from said first group of switch fabric outputs;
submitting, to a second scheduler that performed said scheduling of said output flow for one or more output ports whose traffic is supplied by said second group of outputs from said switch fabric, requests for said sending of traffic destined to be switched by said switch fabric and emanated from said switch fabric from said second group of switch fabric outputs.

35. The method of claim 32 further comprising:
queuing, in a first queue of a second input port, more traffic destined to be switched by said switch fabric and emanated from said switch fabric from said first group of switch fabric outputs; and,
queuing, in a second queue of said second input port, more traffic destined to be switched by said switch fabric and emanated from said switch fabric from said second group of switch fabric outputs.

36. The method of claim 35 further comprising:
sending, along a third input to said switch fabric, said more traffic destined to be switched by said switch fabric and emanated from said switch fabric from said first group of switch fabric outputs;
sending, along a fourth input to said switch fabric, said more traffic destined to be switched by said switch fabric and emanated from said switch fabric from said second group of switch fabric outputs.

37. The method of claim 36 wherein said switch fabric comprises a crossbar switch.

38. The method of claim 31 further comprising:
submitting, to a first scheduler that performed said scheduling of said output flow for one or more output ports whose traffic is supplied by a first group of outputs from said switch fabric, requests for said sending of traffic destined to be switched by said switch fabric and emanated from said switch fabric from said first group of switch fabric outputs;
submitting, to a second scheduler that performed said scheduling of said output flow for one or more output ports whose traffic is supplied by a second group of outputs from said switch fabric, requests for said sending of traffic destined to be switched by said switch fabric and emanated from said switch fabric from said second group of switch fabric outputs;
submitting, to said first scheduler that performed said scheduling of said output flow for one or more output ports whose traffic is supplied by said first group of outputs from a switch fabric, requests for said sending of more traffic destined to be switched by said switch fabric and emanated from said switch fabric from said first group of switch fabric outputs;
submitting, to said second scheduler that performed said scheduling of said output flow for one or more output ports whose traffic is supplied by said second group of outputs from a switch fabric, requests for said sending of more traffic destined to be switched by said switch fabric and emanated from said switch fabric from said second group of switch fabric outputs.

39. An apparatus, comprising:
means for scheduling an output flow for one or more output ports whose traffic is supplied by a first group of outputs from a switch fabric;
means for scheduling an output flow for one or more other output ports whose traffic is supplied by a second group of outputs from said switch fabric, said first group not including any of said second group's switch fabric outputs, said second group not including any of said first group's switch fabric outputs;
means for queuing, in a first queue of a first input port, traffic destined to be switched by said switch fabric and emanated from said switch fabric from said first group of switch fabric outputs; and, means for queuing, in a second queue of said first input port, traffic destined to be switched by said switch fabric and emanated from said switch fabric from said second group of switch fabric outputs.

40. The apparatus of claim 39 further comprising:

means for sending, along a first input to said switch fabric, said traffic destined to be switched by said switch fabric and emanated from said switch fabric from said first group of switch fabric outputs;

means for sending, along a second input to said switch fabric, said traffic destined to be switched by said switch fabric and emanated from said switch fabric from said second group of switch fabric outputs.

41. The apparatus of claim 40 wherein said switch fabric comprises a crossbar switch.

* * * * *